US008407398B2

(12) United States Patent
Hobbet et al.

(10) Patent No.: US 8,407,398 B2
(45) Date of Patent: Mar. 26, 2013

(54) CACHE MAPPING FOR SOLID STATE DRIVES

(75) Inventors: Jeffrey R. Hobbet, Holly Springs, NC (US); Donald R. Frame, Apex, NC (US); David Timothy Zimmerman, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 762 days.

(21) Appl. No.: 12/243,781

(22) Filed: Oct. 1, 2008

(65) Prior Publication Data

US 2010/0082936 A1  Apr. 1, 2010

(51) Int. Cl.
*G06F 12/00* (2006.01)
(52) U.S. Cl. ........................................ 711/103; 711/118
(58) Field of Classification Search .................. None
See application file for complete search history.

(56) References Cited

U.S. PATENT DOCUMENTS

| 5,604,906 | A | * | 2/1997 | Murphy et al. | 717/162 |
| 6,920,533 | B2 | * | 7/2005 | Coulson et al. | 711/145 |
| 2006/0168403 | A1 | * | 7/2006 | Kolovson | 711/142 |
| 2008/0082735 | A1 | * | 4/2008 | Shiga | 711/103 |

* cited by examiner

*Primary Examiner* — Tuan Thai
*Assistant Examiner* — Daniel Tsui
(74) *Attorney, Agent, or Firm* — John L. Rogitz

(57) ABSTRACT

An approach is provided that loads software files, such as an operating system, on a hybrid storage device. The hybrid storage device is a device that includes a nonvolatile storage device and a nonvolatile memory cache. The nonvolatile memory cache has less storage capacity than the nonvolatile storage device. The nonvolatile memory cache is preset ("pinned") to data corresponding to an initial set of address ranges of the nonvolatile storage device, such as all or part of the operating system that was loaded onto the nonvolatile storage device. A system usage metric is initialized along with a threshold value. The nonvolatile memory cache remains pinned to the initial set of address ranges until the system usage metric reaches the threshold value. When the system usage metric reaches the threshold value, then a caching algorithm is used to determine what data should be cached to the nonvolatile memory cache.

18 Claims, 7 Drawing Sheets

CACHE MAPPING FOR SOLID STATE DRIVES

BACKGROUND OF THE INVENTION

1. Technical Field

The present invention relates to a system, method, and program product that improves cache mapping for solid state drives. More particularly, the present invention relates to an approach to initially pin an area of the drive to the cache until a metric, such as an initial time period, is reached.

2. Description of the Related Art

In the nonvolatile storage industry, Solid State Drives (SSDs) are an emerging player to traditional spinning platter hard drives. SSDs often provide improved performance, reliability, and power. However, SSDs are currently challenged by lower capacity capabilities and high cost points. In an effort to merge the two technologies, some suppliers using a traditional spinning platter HDD and adding flash memory to the drives printed circuit board assembly (PCBA) to create a drive that is a combination of spinning platter and solid state technology. In essence, the flash memory acts as a large, non-volatile, read cache for the spinning platters. In traditional systems, caching algorithms are used by the HDD to decide what to place inside the flash memory portion of the drive. The overall performance of the drive is dependant on the hit rate of the flash memory cache. A challenge of traditional caching algorithms is that they work better after the system is stabilized (e.g., after the operating system and user applications are loaded) so that the algorithms can better decide what data is most often used by the user and, therefore, what data to maintain in the nonvolatile flash memory cache. Because of this shortcoming of traditional caching algorithms used with solid state drives, these drives and algorithms perform relatively poorly on new systems (e.g., before the operating system and application programs have been loaded and the system has not learned which data files are more frequently used by the customer). This poor "out-of-the-box" performance can lead the customer to believe that the overall system is poor performing and can result in a customer having a negative connotation with the computer system and the system's manufacturer.

SUMMARY

It has been discovered that the aforementioned challenges are resolved using an approach that loads software files, such as an operating system and perhaps user applications, on a hybrid storage device. The hybrid storage device is a device that includes a nonvolatile storage device (e.g., hard disk platters, etc.) and a nonvolatile memory cache. The nonvolatile memory cache has less storage capacity than the nonvolatile storage device. The nonvolatile memory cache is preset ("pinned") to data corresponding to an initial set of address ranges of the nonvolatile storage device, such as all or part of the operating system that was loaded onto the nonvolatile storage device. A system usage metric is initialized along with a threshold value. The nonvolatile memory cache remains pinned to the initial set of address ranges (e.g., the operating system, etc.) until the system usage metric (e.g., the amount of time the system is used, etc.) reaches the threshold value. When the system usage metric reaches the threshold value, then a caching algorithm is used to determine what files (address ranges) that are stored on the nonvolatile storage device should be cached to the nonvolatile memory cache. However, until this system usage metric reaches the threshold value, the data (e.g., files) stored in the nonvolatile memory cache remain static ("pinned").

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
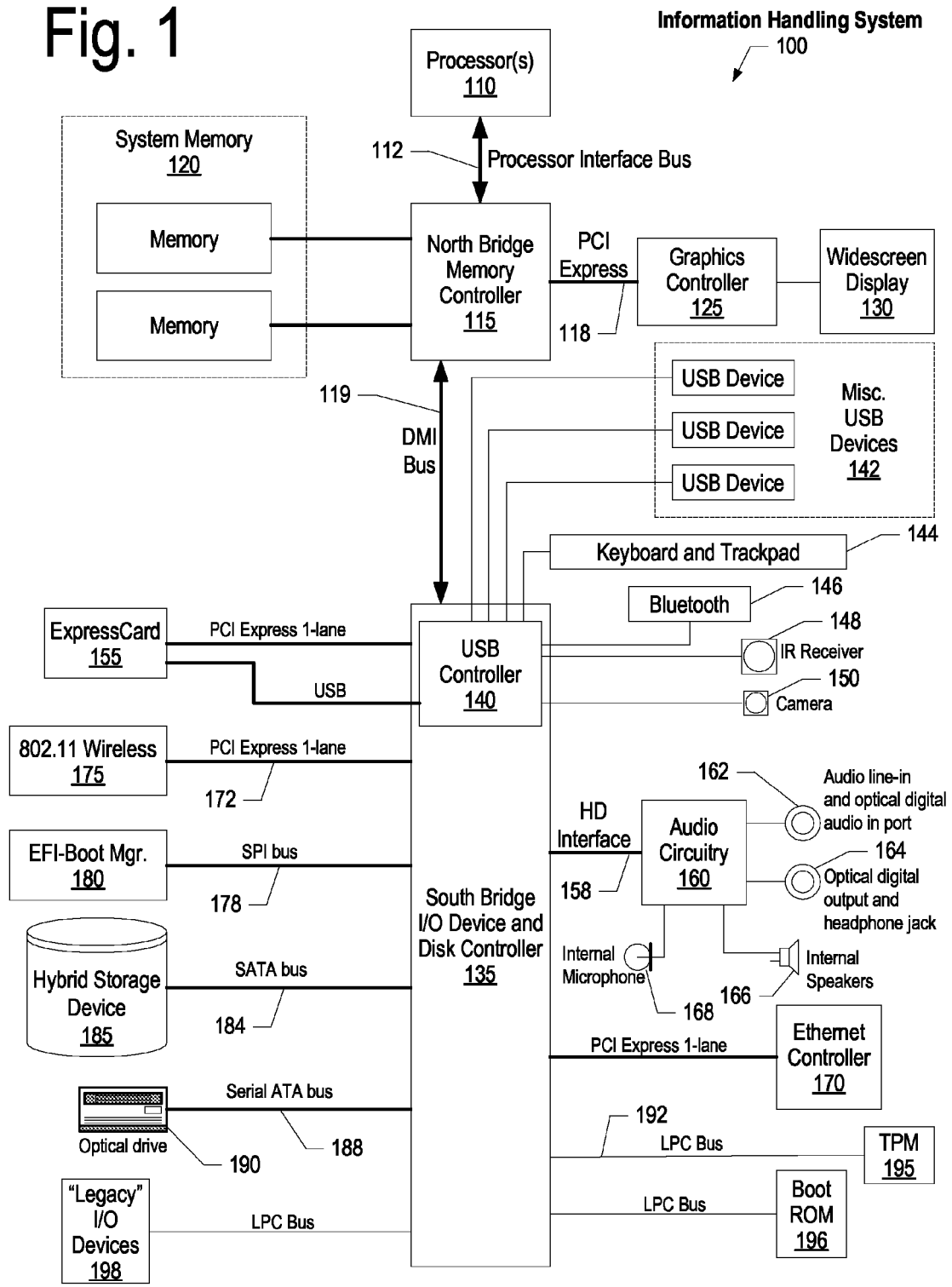
FIG. 1 is a block diagram of a data processing system in which the methods described herein can be implemented.
Figure 2:
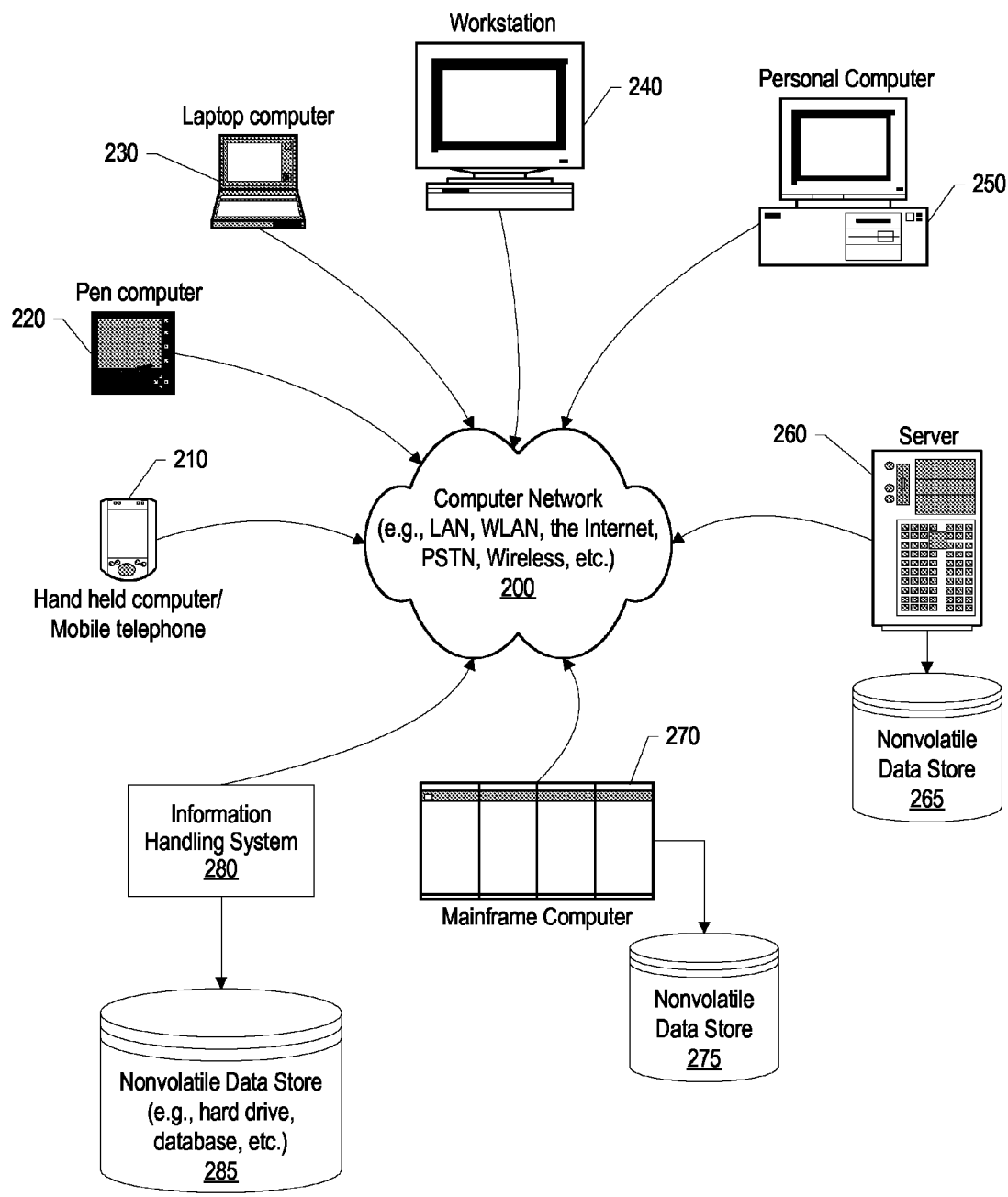
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hybrid storage device, using bus 184. A hybrid storage device includes a nonvolatile storage device (e.g., disk platters) and a nonvolatile memory cache (e.g., flash memory). The nonvolatile memory cache has less storage capacity than the nonvolatile storage device and is used to cache some of the data stored on the nonvolatile storage device. As described herein, the data that is cached in the nonvolatile memory cache is preset ("pinned") to an initial set of memory ranges, such as the ranges where all or part of the operating system is loaded on the nonvolatile storage device. The cache remains pinned to this initial set of addresses until a metric is reached (e.g., the system is used for a predetermined amount of time, etc.). When the metric is reached, then use of one or more caching algorithm commences in order to determined subsequent address ranges (e.g., files) to cache in the nonvolatile memory cache.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
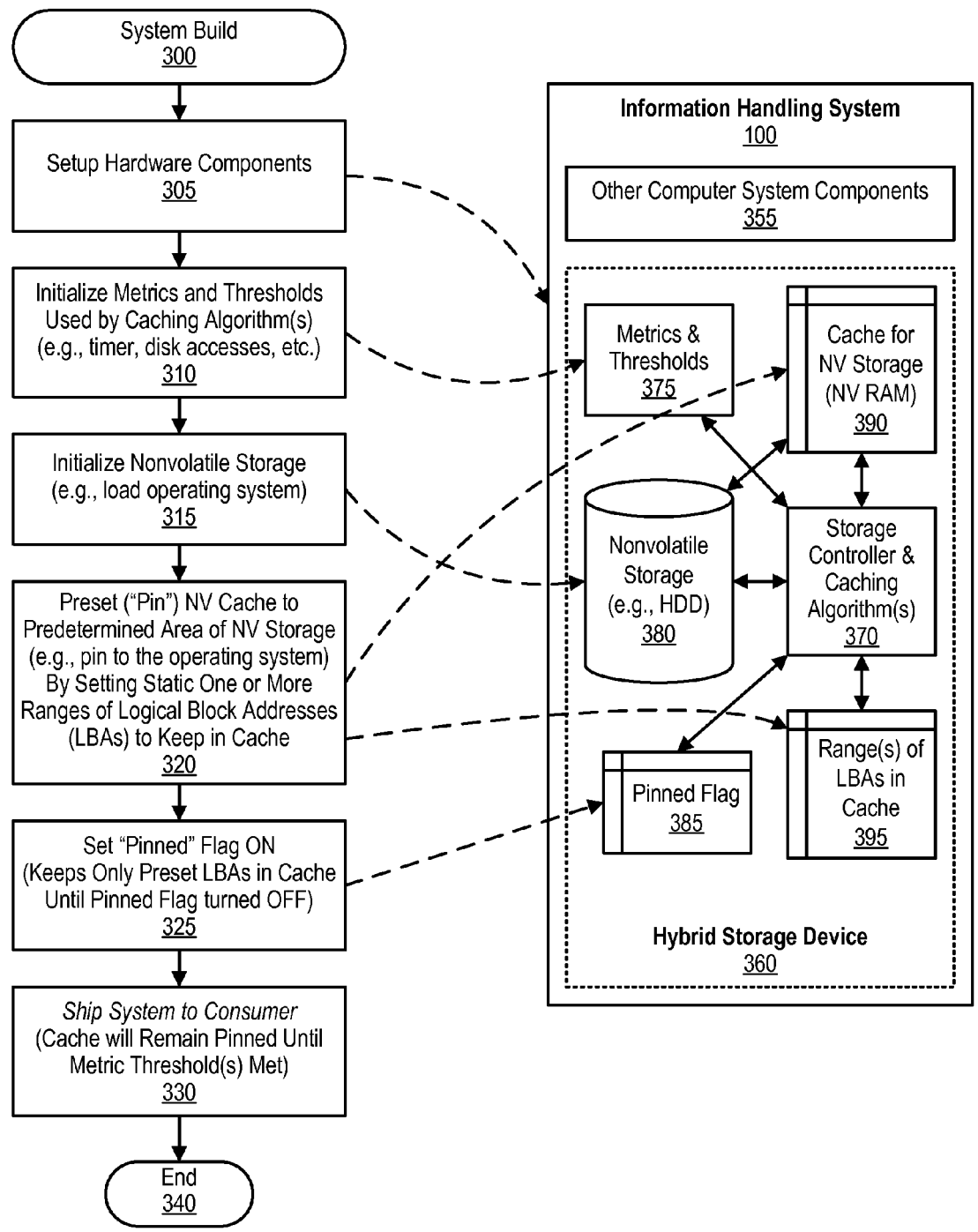
FIG. 3 is a high level flowchart showing steps taken to build a computer system with the nonvolatile memory cache mapping to a static set of address ranges in the nonvolatile storage device until system usage metrics reach a preset threshold value.

FIG. 3 is a high level flowchart showing steps taken to build a computer system with the nonvolatile memory cache mapping to a static set of address ranges in the nonvolatile storage device until system usage metrics reach a preset threshold value. Processing commences at 300 whereupon, at step 305, the manufacturer sets up hardware components included in information handling system 100. These computer components include hybrid storage device 360 as well as other computer system components 355, such as processors, memory, and other components that were previously introduced in FIG. 1.

The process shown in FIGS. 3-7 is an approach to initially pin the nonvolatile storage (e.g., a spinning platter, etc.) to an initial region in recognition that the initial access patterns of using the nonvolatile storage during manufacturing and initial application installation performed by manufacturers, value-added resellers (VARs), and customers, are not typical access patterns that will be used when the system is deployed in a day-to-day usage environment of an end-user. In fact, the initial access patterns generally only occur one time during the manufacturing and initial software loading process. Because of the unique circumstances surrounding initial bring-up, typical caching algorithms leave the cache in a non-optimal state because traditional caching algorithms track usage of files which, as described above, is different during initial bring-up than when the system is loaded with software and deployed to an end user. The approach described herein allows the traditional caching algorithms to commence after most of the one-time actions (e.g., application loading, etc.) have taken place. This approach, as described herein, provides a more optimized out-of-the-box experience to the end-user in terms of system performance.

Hybrid storage device 360 includes a number of components including nonvolatile storage device 380, such as a hard disk drive (e.g., disk platters) and nonvolatile memory cache 390 which is used to cache a portion of nonvolatile storage device 390. Access to nonvolatile storage device 380 is controlled by storage controller 370 which includes one or more caching algorithms used to determine which data to maintain in cache 390 when the caching algorithms are activated. Initially, as explained below, the caching algorithm is deactivated with preset data maintained in the cache. Metrics and thresholds 375 are used to measure system usage and compare the system usage to a preset threshold so that the caching algorithms are activated when the system usage metric reaches the desired threshold. For example, the metric used could be use of the system for a certain number of hours with the threshold set to the number of hours the system is used by the user (e.g., customer, consumer, etc.) before the caching algorithms are activated. If the system usage metric has not reached the threshold, then the address ranges of the data being cached remains fixed (e.g., a static or "pinned" set of address ranges). A list of the address ranges that are being maintained in nonvolatile memory cache 390 are kept in nonvolatile memory area 395 with nonvolatile memory area 385 storing a "pinned flag" that indicates whether the ranges stored in memory area 395 are "static" (e.g., unchanged by caching algorithms when the pinned flag is set) or "dynamic" (e.g., the address ranges stored in memory 395 are updated by caching algorithms 370 executed by the storage controller). In this manner, the address ranges stored in nonvolatile memory area 395 can be fixed (static) for an initial period of time until system usage metrics (375) have reached particular thresholds (375). For example, the initial (static) address ranges stored in memory area 395 might be the address ranges where all or part of the operating system resides on the nonvolatile storage device and these address ranges would be left static until the system usage metrics have reached the predetermined thresholds, such as the system being used for ten days by the user. When the system usage metric reaches the threshold, pinned flag 385 is cleared and the storage controller commences using one or more caching algorithms to determine which address ranges should be maintained in nonvolatile memory cache 390 and stores such address ranges in the list stored in memory area 395. So, after the user uses the system for an amount of time and reaches the threshold set in 375, if the caching algorithm determines that the user is often using a particular application program, such as an email client, word processor, or the like, than these often-used programs can be cached in nonvolatile memory cache 390.

Turning now to the system build processing steps, as previously mentioned, processing commences at 300 whereupon, at step 305 the system builder (e.g., manufacturer, etc.) sets up hardware components in computer system including hybrid storage device 360 and other system components 355. At step 310, metrics and thresholds that are used to determine when to unpin the address ranges maintained in the nonvolatile memory cache are initialized. Many various metrics and associated thresholds can be utilized depending upon the circumstances where the system is intended to be used. For example, the metrics could measure the amount of time the system is used before clearing the pinned flag, could count the number of disk accesses that occur before clearing the pinned flag, or any number of other metrics and associated thresholds. Furthermore, the value of the threshold could be altered based upon the type of expected usage. For example, systems intended for home consumption might have longer threshold times than systems that are intended for business consumption.

At step 315, the nonvolatile storage device (e.g., hard drive) is loaded with the software files (e.g., operating system, application programs, etc.) that are being provided by the manufacturer. For example, most computer systems come pre-loaded with an operating system, such as Windows Vista™, Linux™, or the like, so that the system is usable by the end-user (customer) when received. Often, during the ordering process, the customer is able to choose the operating system and applications, often provided at different monetary costs, that the customer wants pre-loaded onto the system by the manufacturer. The order of operations shown in FIG. 3 can be altered so that the initialization of the metrics and thresholds (step 310) occurs after the nonvolatile storage device is loaded with the operating system, etc. At step 320, the nonvolatile memory cache is preset to a set of address ranges of data stored in nonvolatile storage device 380, such a set of address ranges where the operating system resides. A copy of the actual data (executables, etc.) corresponding to the set of address ranges are stored in nonvolatile memory cache 390 while the list of address ranges that are stored in nonvolatile memory cache 390 is stored in nonvolatile memory area 395 that is used to keep the list of address ranges maintained in the nonvolatile memory cache. At step 325, pinned flag 385 is set (e.g., turned "ON", etc.) to indicate that the set of address ranges for data maintained in nonvolatile memory cache 390 is static. In other words, if address range x0000 to xFFFF is listed in memory area 395 and pinned flag 385 is set, then if the data in this address range changes (e.g., when the user configures a setting, etc.), then an updated copy of the changed data is reflected (copied) to nonvolatile memory cache 390. However, while the pinned flag is set, the range of addresses kept in the list stored in memory area 395 is not changed by the storage controller and/or caching algorithms. At step 330, the system, now set up with an initialized hybrid storage device, is shipped to a customer (e.g., end user, etc.) and system build processing ends at 340.

Figure 4:
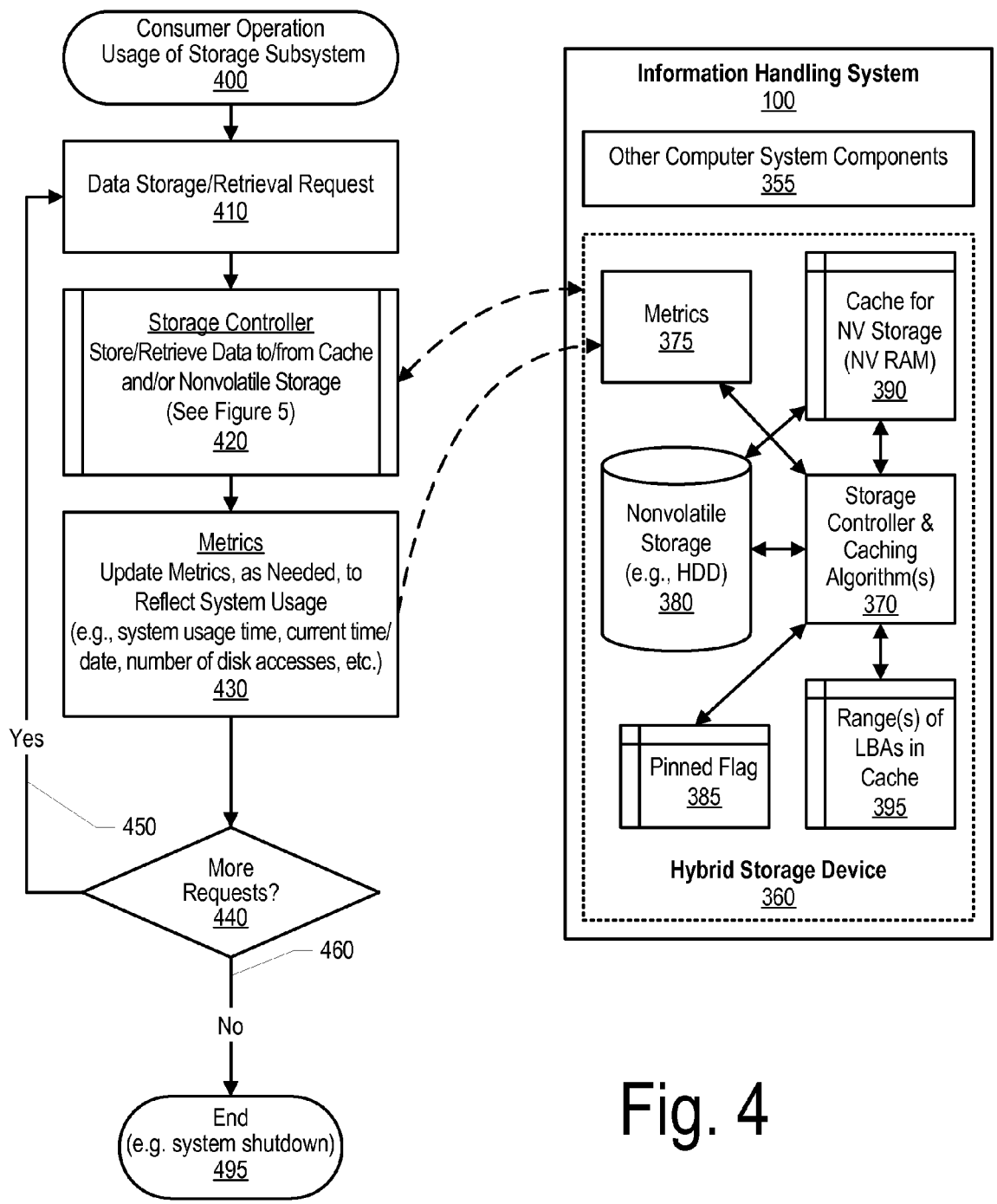
FIG. 4 is a flowchart showing usage of the computer system, and particularly the hybrid storage device, by a user (consumer) of the system after the system has been built using the process shown in FIG. 3.

FIG. 4 is a flowchart showing usage of the computer system, and particularly the hybrid storage device, by a user (consumer) of the system after the system has been built using the process shown in FIG. 3. Processing commences at 400 when the user receives the information handling system from the manufacturer and starts using the system for any number of activities. At step 410, the information handling system (e.g., processors, etc.) make data storage and retrieval requests to hybrid storage device 360. Predefined process 420 handles the requests using the storage controller (see FIG. 5 and corresponding text for processing details). At step 430, the system usage metrics initialized in 375 by the system manufacturer (e.g., the amount of time the system is used, the current timestamp, the number of disk accesses/requests made to the hybrid storage device, etc.) are updated to reflect the user's use of the information handling system. Predefined process 420 is used to determine if the system usage metrics have reached the predetermined thresholds and whether to clear pinned flag 385 (see FIG. 5 and corresponding text for processing details). A determination is made as to whether there are more data storage/retrieval requests to the hybrid storage device (decision 440). If there are additional storage requests to process, then decision 440 branches to "yes" branch 450 which loops back to handle the next storage request. This looping continues until there are no further requests to process (e.g., the system is shutdown, powered off, etc.), at which point decision 440 branches to "no" branch 460 and processing ends at 495.

Figure 5:
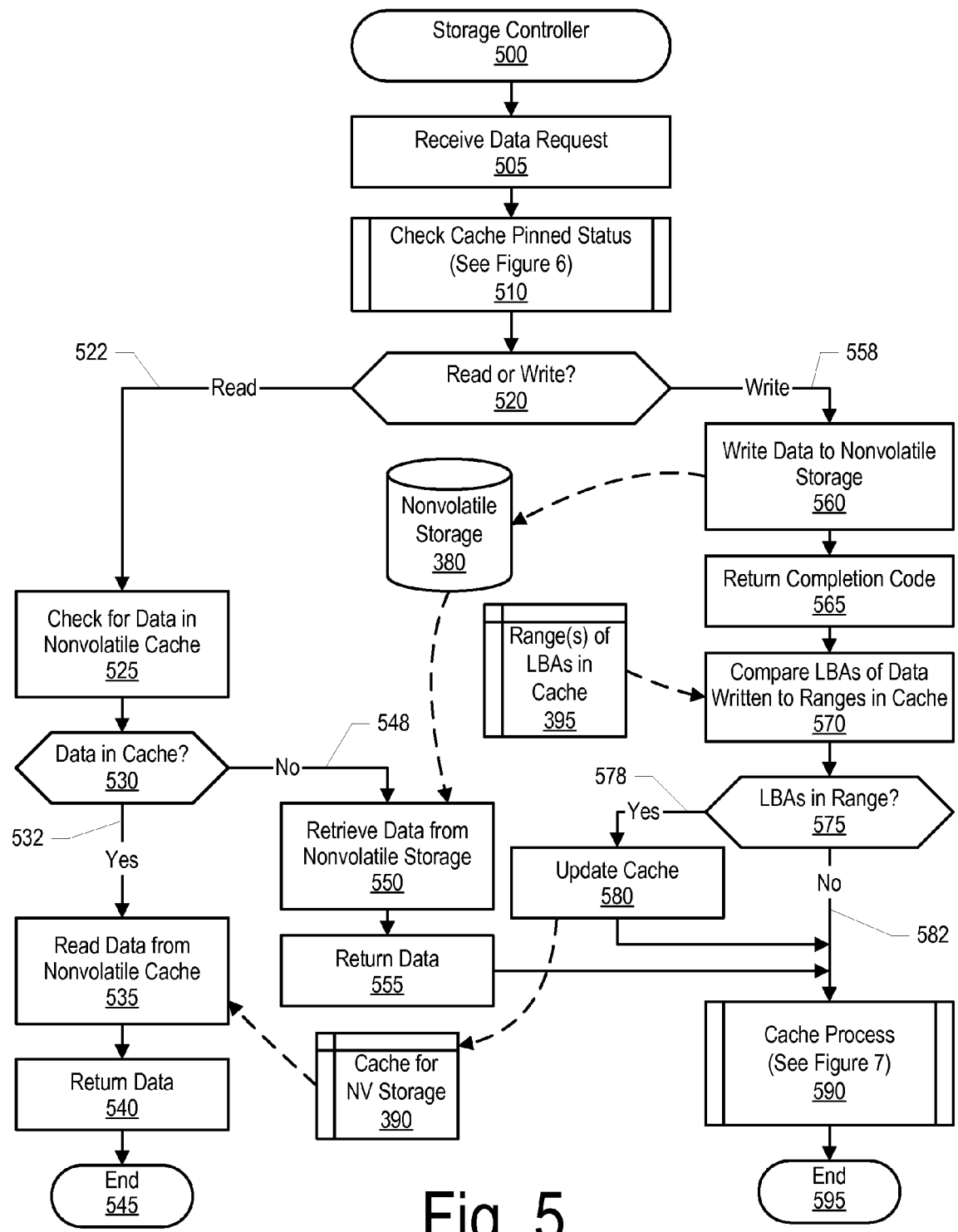
FIG. 5 is a flowchart showing steps taken by the hybrid storage device's storage controller to access the nonvolatile storage device and maintain the nonvolatile memory cache.

FIG. 5 is a flowchart showing steps taken by the hybrid storage device's storage controller to access the nonvolatile storage device and maintain the nonvolatile memory cache. Storage controller processing commences at 500 whereupon, at step 505, the storage controller receives the data request to store or retrieve data from the hybrid storage device. At predefined process 510, the storage controller checks to see if the set of memory addresses maintained in the nonvolatile memory cache are pinned (fixed, static, etc.) or unpinned (updatable, dynamic, etc.). A determination is made as to whether the data request is to read data from or write data to the hybrid storage device (decision 520). If the request is a read request, then decision 520 branches to "read" branch 522 whereupon, at step 525 a check is made to determine if the address ranges being read are being maintained in the nonvolatile memory cache (by reading the list of address ranges 395 shown in FIGS. 3, 4, 6, and 7). A determination is made as to whether the data being read is being maintained in the nonvolatile data cache (decision 530). If the data is being maintained in the nonvolatile data cache, then decision 530 branches to "yes" branch 532 whereupon, at step 535 the data is read from nonvolatile memory cache 380 rather than having to read the data from the nonvolatile storage device 380 (e.g., hard drive platters, etc.). At step 540, the data is returned to the requester (e.g., a requesting process by storing the retrieved data in memory accessible by the processors used to execute the process, etc.). Processing then ends at 545.

Returning to decision 530, if the data being requested by the read request is not being maintained by the nonvolatile memory cache, then decision 530 branches to "no" branch 548 whereupon, at step 550 the data is retrieved from nonvolatile storage device 380 and the retrieved data is returned to the requester at step 555. Predefined process 590 then operates to determine if a copy of the data read from nonvolatile storage device 380 should be maintained in nonvolatile storage cache depending on whether the cache is currently pinned (static) and, if the nonvolatile storage cache is not pinned, whether the caching algorithm indicates that the data should be cached (e.g., based on the frequency that the data has been requested, the available free space in nonvolatile memory cache 390, etc.). See FIG. 7 and corresponding text for processing details regarding the caching process). Processing then ends at 595.

Returning to decision 520, if the request is to write data to the hybrid storage device, then decision 520 branches to "write" branch 558 whereupon, at step 560, the data included in the request is written to nonvolatile storage device 380 and, at step 565 a completion code is returned to the requestor (e.g., the process requesting that the data be stored). At step 570, the address range(s) of the data written to nonvolatile storage device 380 are compared with the set of address ranges maintained in the nonvolatile memory cache by reading from the list of address ranges 395. A determination is made as to whether the data written to the nonvolatile storage device falls within the address range(s) of data maintained in the nonvolatile memory cache (decision 575). If the data written is within the range of addresses maintained in the nonvolatile memory cache, then decision 575 branches to "yes" branch 578 whereupon, at step 580, nonvolatile memory cache 390 is updated accordingly. However, if the data written is not within the range of addresses maintained in nonvolatile memory cache 390, then decision 575 branches to "no" branch 585 bypassing step 580.

Irregardless of whether the data written is within the range of addresses maintained in nonvolatile memory cache 390, predefined process 590 is executed to determine if a copy of the data read from nonvolatile storage device 380 should be maintained in nonvolatile storage cache depending on whether the cache is currently pinned (static) and, if the nonvolatile storage cache is not pinned, whether the caching algorithm indicates that the data should be cached (e.g., based on the frequency that the data has been requested, the available free space in nonvolatile memory cache 390, etc.). See FIG. 7 and corresponding text for processing details regarding the caching process). Processing then ends at 595.

Figure 6:
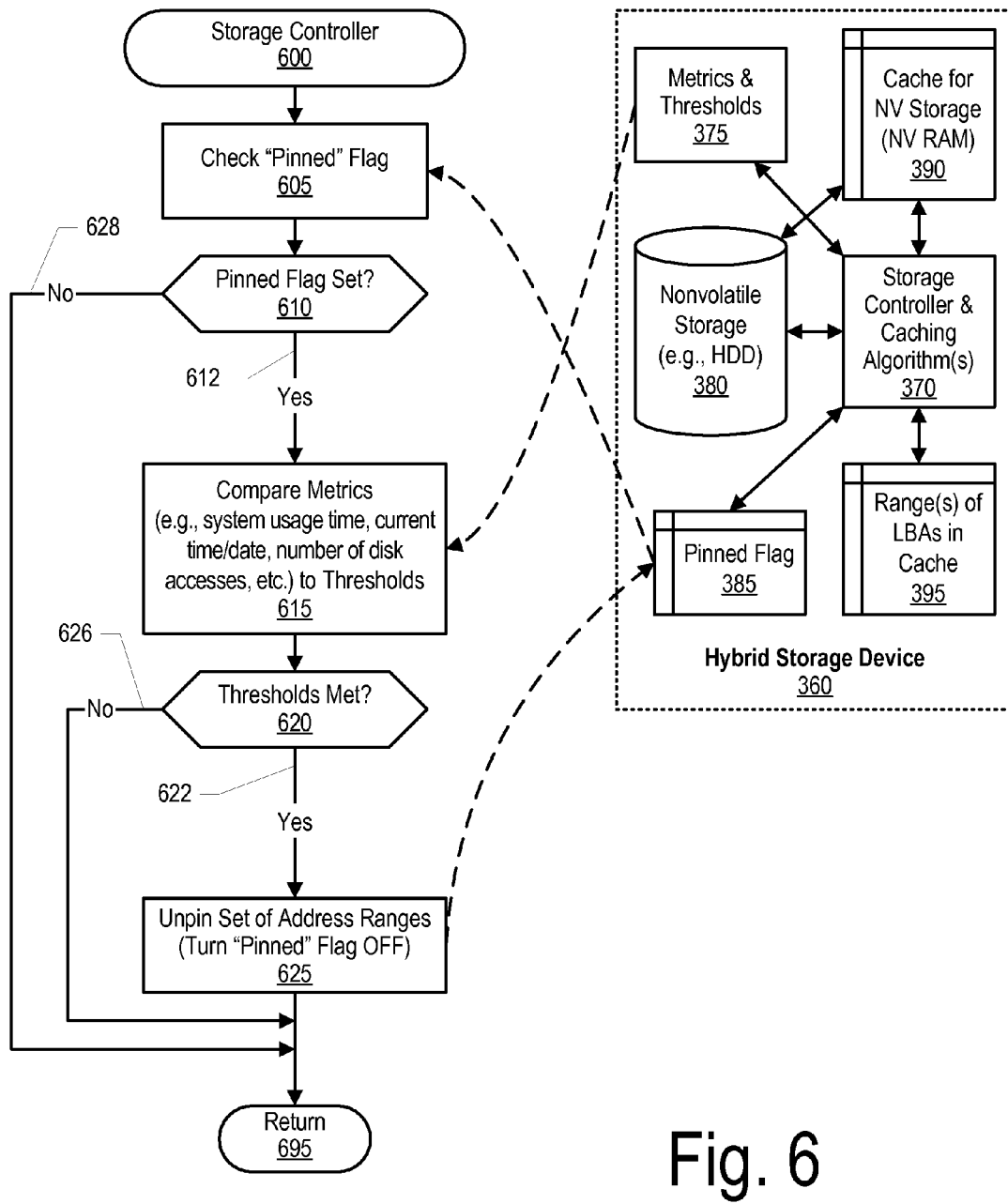
FIG. 6 is a flowchart showing steps taken by storage controller to check the pinned status of the hybrid storage device.

FIG. 6 is a flowchart showing steps taken by storage controller to check the pinned status of the hybrid storage device. Processing commences at 600 whereupon, at step 605, pinned flag 385 is checked. As previously described, pinned flag 385 is used to indicate whether the address ranges of data maintained in nonvolatile memory cache 390 is currently pinned (fixed, static, etc.) or if the data has been unpinned (and therefore the address ranges can be updated by one or more caching algorithms). A determination is made as to whether the pinned flag is currently set ("ON", "TRUE", etc), at decision 610. If the pinned flag is set, then decision 610 branches to "yes" branch 612 whereupon, at step 615, the system usage metrics are compared with the associated thresholds. A determination is made as to whether the system usage metrics have reached the associated thresholds (decision 620). If the system usage metrics have reached the associated thresholds, then decision 620 branches to "yes" branch 622 whereupon, at step 625 the set of address ranges maintained in nonvolatile memory cache 390 is unpinned by clearing pinned flag 385 (e.g., turning flag "OFF", "FALSE", etc.). Returning to decision 620, if the system usage metrics have not reached the associated thresholds, then decision 620 branches to "no" branch 626 bypassing step 625. Returning to decision 610, if the pinned flag is not set (e.g., the pinned flag was already cleared because the system usage metrics already met the associated thresholds), then decision 610 branches to "no" branch 628 bypassing step 615 to 625. After the processing shown in FIG. 6 has completed, processing returns to the calling routine (see FIG. 5) at 696.

Figure 7:
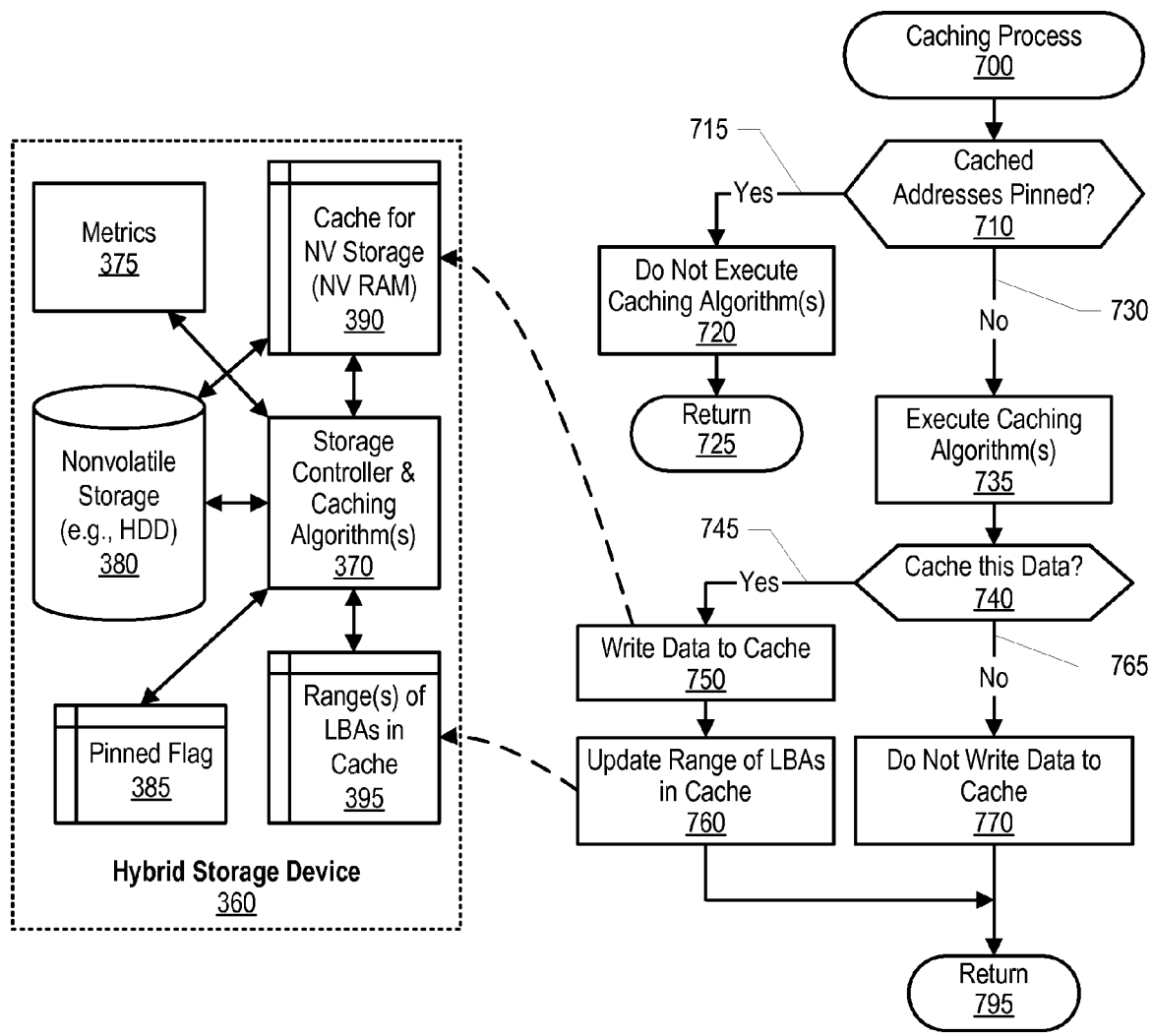
FIG. 7 is a flowchart showing steps taken by storage controller to run a caching algorithm when the initial set of data is no longer pinned in the nonvolatile memory cache.

FIG. 7 is a flowchart showing steps taken by storage controller to run a caching algorithm when the initial set of data is no longer pinned in the nonvolatile memory cache. Caching processing is shown commencing at 700 whereupon a determination is made as to whether the set of addresses that are cached in nonvolatile memory cache 390 are pinned (decision 710). If the set of addresses are pinned, then decision 710 branches to "yes" branch 715 whereupon the caching algorithms are not executed (or, even if the caching algorithms are executed, they do not used to update the set of addresses that are cached in the nonvolatile memory cache 390). Processing then returns to the calling routine (see FIG. 5) at 725.

On the other hand, if the set of addresses that are cached in nonvolatile memory cache 390 are not pinned, and are therefore updatable, then decision 710 branches to "no" branch 730 whereupon, at step 735 one or more traditional caching algorithms are executed. A determination is made, based on the results of the caching algorithm, as to whether the data that is being read or written should be cached (decision 740). If the data should be cached, then decision 740 branches to "yes" branch 745 whereupon, at step 750, the data is written to nonvolatile memory cache 750 and the set of addresses of data maintained in the nonvolatile memory cache is updated by storing the appropriate address ranges in memory area 395. Returning to decision 740, if the caching algorithm indicates that the data should not be cached, then decision 740 branches to "no" branch 765 whereupon, at step 770 the data is not written to nonvolatile memory cache 390. In addition, at step 770, the range of addresses of data maintained in the nonvolatile memory cache may be updated by removing the address range if the address range used to be cached but the caching algorithms determined that the data should no longer be cached in nonvolatile memory cache 390. Regardless of the result of decision 740, processing returns to the calling routine (see FIG. 5) at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:

loading a plurality of software files on a hybrid storage device, wherein the hybrid storage device includes a nonvolatile storage device and a nonvolatile memory cache that has less storage capacity than the nonvolatile storage device;

presetting the nonvolatile memory cache to data corresponding to an initial set of address ranges of the nonvolatile storage device;

initializing a system usage metric and a threshold value, wherein the threshold value indicates a threshold number of storage requests corresponding to the hybrid storage device and the system usage metric corresponds to an actual number of storage requests to the hybrid storage device as a whole;

comparing the system usage metric with the threshold value;

maintaining the initial set of address ranges of the nonvolatile storage device in the nonvolatile memory cache until the system usage metric reaches the threshold value and not executing a caching algorithm to change contents of the cache prior to the system usage metric reaching the threshold value, the caching algorithm determining one or more subsequent sets of address ranges of the nonvolatile storage device to store in the nonvolatile memory cache; and executing the caching algorithm that determines one or more subsequent sets of address ranges of the nonvolatile storage device to store in the nonvolatile memory cache only in response to a determination that the system usage metric has reached the threshold value.

2. The method of claim 1 further comprising:
receiving, at a storage controller included with the hybrid storage device, a data request;
identifying a requested address range corresponding to the data request;
comparing the requested address range to a set of address ranges corresponding to data stored in the nonvolatile memory cache, wherein the set of address ranges is selected from the initial set of address ranges and the subsequent sets of address ranges;
in response to the requested address range being included in the set of address ranges, updating the data stored in the nonvolatile memory cache;
updating the system usage metric in response to determining that the nonvolatile memory cache is currently preset to the initial set of address ranges based on the comparison of the system usage metric to the threshold value; and
executing the caching algorithm by a processor included in the storage controller in response to determining that the nonvolatile memory cache is no longer preset to the initial set of address ranges based on the comparison of the system usage metric to the threshold value.

3. The method of claim 2 further comprising:
during the initializing, setting a flag in a nonvolatile memory area accessible from the storage controller, wherein the flag indicates that the cache is currently preset to the initial set of address ranges;
when the system usage metric reaches the threshold value, clearing the flag to indicate that the cache is not preset to the initial set of address ranges; and
maintaining a list of the set of address ranges in the nonvolatile memory area.

4. The method of claim 3 wherein the hybrid storage device includes an enclosure which includes the nonvolatile storage device, the nonvolatile memory cache, the storage controller, the nonvolatile memory where the flag and the list of the set of addresses is stored, wherein the storage controller includes a set of storage controller instructions stored in the nonvolatile memory that includes the caching algorithm, and a storage controller processor that executes the storage controller instructions and the caching algorithm.

5. The method of claim 2 further comprising:
configuring, by a manufacturer, a plurality of hardware components included in a computer system, wherein one of the hardware components is the hybrid storage device, and wherein the presetting and initializing is performed by the manufacturer; and
after the configuring and before the system usage metric, delivering the computer system to a user.

6. The method of claim 5 wherein the execution of the caching algorithm commences after the system has been used by the user for a period of time.

7. An information handling system comprising:
one or more processors;
a memory accessible by at least one of the processors;
a hybrid storage device, wherein the hybrid storage device includes a nonvolatile storage device and a nonvolatile memory cache that has less storage capacity than the nonvolatile storage device;
a storage controller included in the hybrid storage;
a set of instructions which are loaded into memory and executed by at least one of the processors in order to perform actions of:
loading a plurality of software files on the hybrid storage device;
presetting the nonvolatile memory cache to data corresponding to an initial set of address ranges of the nonvolatile storage device;
initializing a system usage metric and a threshold value, wherein the threshold value indicates a threshold number of storage requests corresponding to the hybrid storage device and the system usage metric corresponds to number of total storage requests to the hybrid storage device;
comparing the system usage metric with the threshold value;
maintaining the initial set of address ranges of the nonvolatile storage device in the nonvolatile memory cache until the system usage metric reaches the threshold value at least in part by not executing a caching algorithm that determines one or more subsequent sets of address ranges of the nonvolatile storage device to store in the nonvolatile memory cache to change contents of the cache responsive to a determination that the system usage metric has not reached the threshold value; and
executing the caching algorithm that determines one or more subsequent sets of address ranges of the nonvolatile storage device to store in the nonvolatile memory cache only responsive to a determination that the system usage metric has reached the threshold value.

8. The information handling system of claim 7 wherein the storage controller includes storage controller instructions that perform steps comprising:
receiving a data request;
identifying a requested address range corresponding to the data request;
comparing the requested address range to a set of address ranges corresponding to data stored in the nonvolatile memory cache, wherein the set of address ranges is selected from the initial set of address ranges and the subsequent sets of address ranges;
in response to the requested address range being included in the set of address ranges, updating the data stored in the nonvolatile memory cache;
updating the system usage metric in response to determining that the nonvolatile memory cache is currently preset to the initial set of address ranges based on the comparison of the system usage metric to the threshold value; and
executing the caching algorithm by a processor included in the storage controller in response to determining that the nonvolatile memory cache no longer preset to the initial set of address ranges based on the comparison of the system usage metric to the threshold value.

9. The information handling system of claim 8 wherein the instructions executed by at least one of the processors perform additional actions comprising:
during the initializing, setting a flag in a nonvolatile memory area accessible from the storage controller, wherein the flag indicates that the cache is currently preset to the initial set of address ranges;
when the system usage metric reaches the threshold value, clearing the flag to indicate that the cache is not preset to the initial set of address ranges; and
maintaining, by the storage controller, a list of the set of address ranges in the nonvolatile memory area.

10. The information handling system of claim 9 wherein the hybrid storage device includes an enclosure which includes the nonvolatile storage device, the nonvolatile memory cache, the storage controller, the nonvolatile memory where the flag and the list of the set of addresses is stored, wherein the storage controller includes a set of storage controller instructions stored in the nonvolatile memory that includes the caching algorithm, and a storage controller processor that executes the storage controller instructions and the caching algorithm.

11. The information handling system of claim 8 further comprising:

configuring, by a manufacturer, a plurality of hardware components included in the information handling system, wherein one of the hardware components is the hybrid storage device, and wherein the presetting and initializing is performed by the manufacturer; and after the configuring and before the system usage metric, delivering the information handling system to a user.

12. The information handling system of claim 11 wherein the execution of the caching algorithm commences after the system has been used by the user for a period of time.

13. A computer program product stored in a computer readable medium that is not a transitory signal or carrier wave, comprising functional descriptive material that, when executed by an information handling system, causes the information handling system to perform actions that include:

loading a plurality of software files on a hybrid storage device, wherein the hybrid storage device includes a nonvolatile storage device and a nonvolatile memory cache that has less storage capacity than the nonvolatile storage device;

presetting the nonvolatile memory cache to data corresponding to an initial set of address ranges of the nonvolatile storage device;

initializing a system usage metric and a threshold value, wherein the threshold value corresponds to the system usage metric;

comparing the system usage metric with the threshold value;

maintaining the initial set of address ranges of the nonvolatile storage device in the nonvolatile memory cache until the system usage metric reaches the threshold value; and executing a caching algorithm that determines one or more subsequent sets of address ranges of the nonvolatile storage device to store in the nonvolatile memory cache after the system usage metric reaches the threshold value.

14. The computer program product of claim 13 wherein the functional descriptive material, when executed by the information handling system, causes the information handling system to perform additional actions that include:

receiving, at a storage controller included with the hybrid storage device, a data request;

identifying a requested address range corresponding to the data request;

comparing the requested address range to a set of address ranges corresponding to data stored in the nonvolatile memory cache, wherein the set of address ranges is selected from the initial set of address ranges and the subsequent sets of address ranges;

in response to the requested address range being included in the set of address ranges, updating the data stored in the nonvolatile memory cache;

updating the system usage metric in response to determining that the nonvolatile memory cache is currently preset to the initial set of address ranges based on the comparison of the system usage metric to the threshold value; and executing the caching algorithm by a processor included in the storage controller in response to determining that the nonvolatile memory cache no longer preset to the initial set of address ranges based on the comparison of the system usage metric to the threshold value.

15. The computer program product of claim 14 wherein the functional descriptive material, when executed by the information handling system, causes the information handling system to perform additional actions that include:

during the initializing, setting a flag in a nonvolatile memory area accessible from the storage controller, wherein the flag indicates that the cache is currently preset to the initial set of address ranges;

when the system usage metric reaches the threshold value, clearing the flag to indicate that the cache is not preset to the initial set of address ranges; and maintaining a list of the set of address ranges in the nonvolatile memory area.

16. The computer program product of claim 15 wherein the hybrid storage device includes an enclosure which includes the nonvolatile storage device, the nonvolatile memory cache, the storage controller, the nonvolatile memory where the flag and the list of the set of addresses is stored, wherein the storage controller includes a set of storage controller instructions stored in the nonvolatile memory that includes the caching algorithm, and a storage controller processor that executes the storage controller instructions and the caching algorithm.

17. The computer program product of claim 13 wherein the execution of the caching algorithm commences after the system has been used by a user for a period of time.

18. The computer program product of claim 13 wherein the system usage metric is selected from the group consisting of a number of storage requests, a time value, a timestamp value, and a disk-used value.

* * * * *